No. 619,103. Patented Feb. 7, 1899.
H. VANDER WEYDE.
BICYCLE SUPPORTER.
(Application filed June 7, 1898.)
(No Model.) 2 Sheets—Sheet 1.
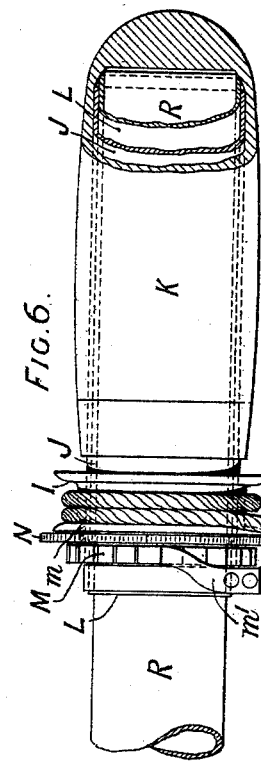
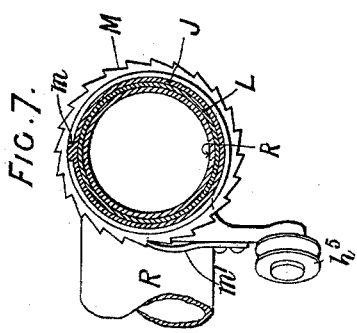
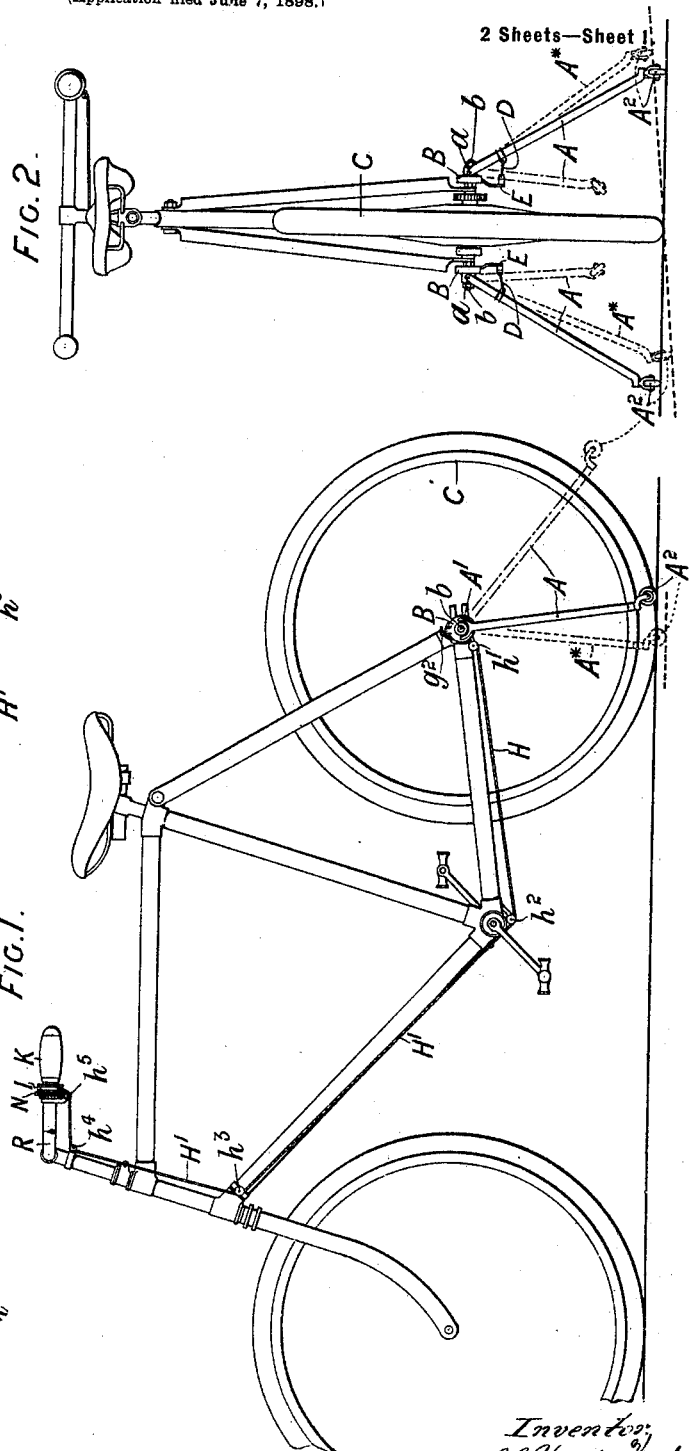
Witnesses
Julius Lutz
A. Lurcott.
Inventor
H. Vander Weyde
By [Attorneys]

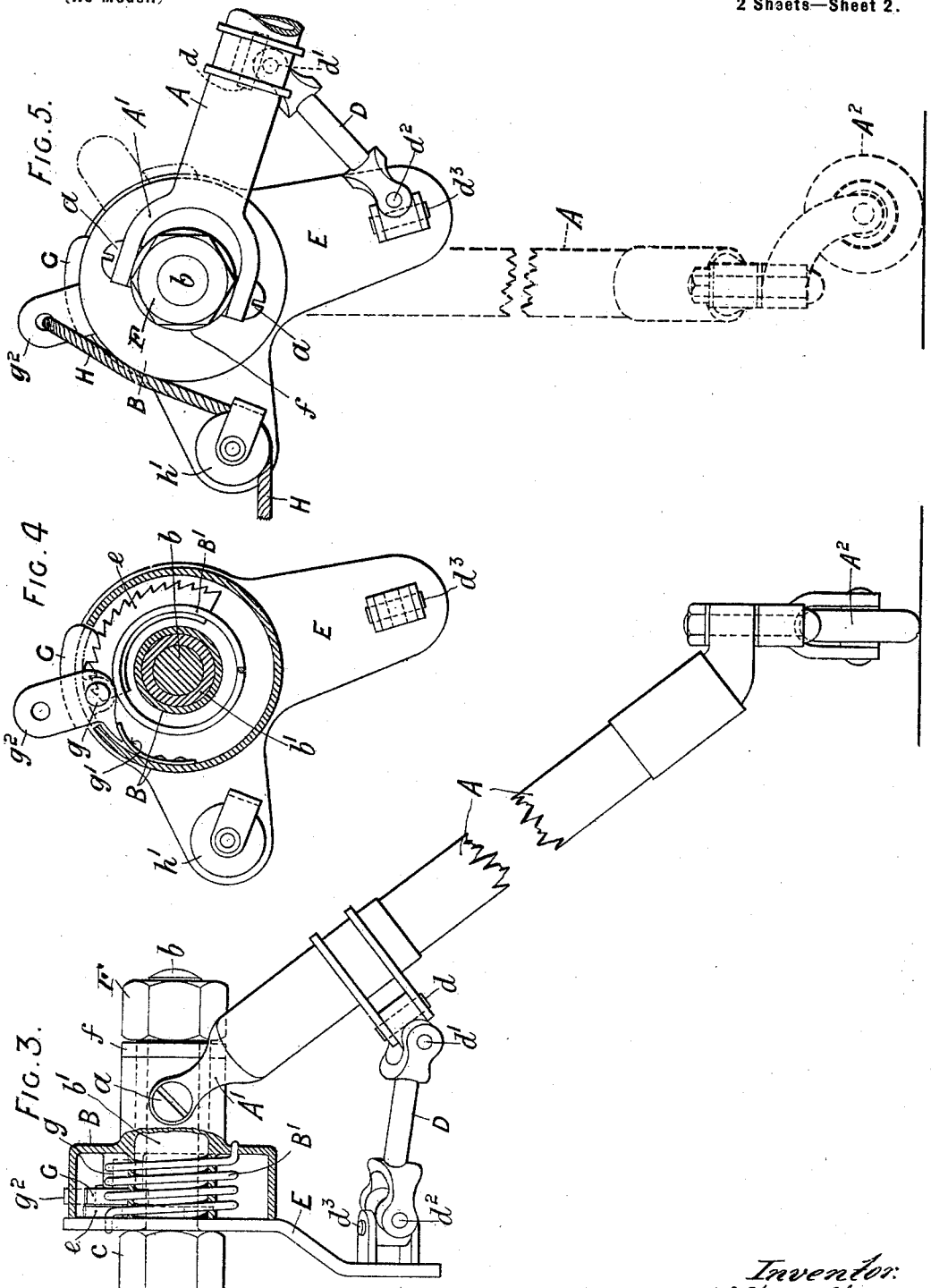

UNITED STATES PATENT OFFICE.

HENRY VANDER WEYDE, OF LONDON, ENGLAND.

BICYCLE-SUPPORTER.

SPECIFICATION forming part of Letters Patent No. 619,103, dated February 7, 1899.

Application filed June 7, 1898. Serial No. 682,798. (No model.)

*To all whom it may concern:*

Be it known that I, HENRY VANDER WEYDE, artist and electric-light photographer, a resident of 182 Regent street, London, England, have invented new and useful Improvements in Bicycle-Supporters, (for which an application for patent has been filed in Great Britain, dated May 3, 1898, No. 10,154,) of which the following is a full, clear, and exact description.

My invention relates to means for supporting a bicycle in the erect position; and it has for its object to provide a simple, light, and compact appliance adapted to afford the lateral support required, the construction and operation of the appliance being such that it may be brought instantaneously and automatically into action whenever required or be put out of action when no longer required without in either case necessitating the removal of the rider's hands from the handles.

The principal object of the support is to enable a rider to remain mounted on the machine when traveling very slowly or when stationary during a temporary obstruction or stoppage of the traffic, to avoid side slipping when upon a greasy or a laterally-sloping surface, and to give a learner self-confidence in mounting and riding.

It has also for its object to adapt the machine to serve as an aiming-rest for military purposes or as a stand for a photographic camera.

The invention will be described with reference to the accompanying drawings, forming part of this specification, wherein—

Figure 1 represents a side elevation, and Fig. 2 a rear elevation, of a bicycle fitted with my improved supporter. Fig. 3 is a front elevation, partly in section, of one of the supporter-legs in operative position; and Fig. 4 is a cross-section taken through the spring-barrel by which it is brought to the operative position. Fig. 5 is a side elevation of the same, the leg being shown in the raised position in full lines and in the lowered position in dotted lines. Fig. 6 is a part-sectional view of one of the handles and winding mechanism, and Fig. 7 is a cross-section of the same.

The same letters of reference denote like parts in all the figures.

The appliance forming the subject of my invention comprises a pair of supporting-legs A A, whose forked upper ends A' are pivoted at $a$ to spring-barrels B, mounted to turn about axes $b$, which may be axially in line with the spindle of the rear wheel C of the machine. The two axes $a$ $b$ are at right angles to one another, so as to form a universal joint permitting of motion of barrel B about axis $b$ and of leg A about axis $a$, the object of this universal motion being to allow of the legs assuming the divergent position represented in full lines in Figs. 1 and 2 when the legs are lowered, so that they will bear upon the ground at such a distance from either side of the rear wheel as to afford the lateral stability required, while allowing of the legs being brought close alongside the back wheel when raised, as shown in dot-and-dash lines in the same figures. The angular motion of the legs A about their axes $a$ is produced by means of links D, each universally jointed at one end to the corresponding leg A by pivotal joints $d$ and $d'$ and at the other end to a fixed plate E by pivotal joints $d^2$ and $d^3$. These links D act as thrust-links to force the legs outward divergently in the act of lowering them and also as stays to prevent their further divergence under the pressure of the weight which comes upon them, and they also act as links to draw the legs inward when they are raised toward the rear. The arm of the plate E which carries the joint $d^3$ is inclined rearward, so that the said joint is situated to the rear of the vertical plane of the axis $b$, with the result that if the length of the leg be such that it will come in contact with laterally-horizontal ground when the leg lies in the common plane of axis $b$ and joint $d^3$ its lower end will still continue to have a descending motion after the leg passes forwardly beyond that plane and will be able to come into contact with ground at a level below the level of the wheel-base, as shown by the dotted lines A* in Figs. 1 and 2.

Each leg A terminates in a trailing wheel A², and the legs are independently operated each by its own spring-barrel B, which contains a coiled spring B', attached by one end to the barrel and by the other end to the fixed plate E, so as to tend constantly to revolve the barrel in the direction to bring the leg down from the raised to the lowered position. The barrel B turns about a sleeve $b'$, which carries the plate E and is fixed upon the stud $b$. This stud may be carried by the nut $c$, which is screwed on the spindle of wheel C in order to fix the spindle in the back fork in the usual way. The barrel B is confined with freedom to turn between the plate E on the one hand and a washer $f$ on the other hand, and it turns loose about the sleeve $b'$, which acts as a tubular distance-piece through which the pressure of nut F, screwed on the threaded end of the stud $b$, is transmitted to the plate E in order to secure it in position by jamming it against nut $c$. The plate E has attached to it a ratchet-toothed segment $e$, with which engages a detent G, pivoted at $g$ to the barrel B and pressed into gear by a spring $g'$, the purpose of the detent being to lock the barrel, and consequently the leg A, rigidly in the operative position to which it has been brought by the action of its spring B', the disengagement of the detent and the raising of the leg A out of operative position being effected by the pull of a cord H, attached to the tail end $g^2$ of the detent G and passing around guide-pulleys $h'$ $h^2$.

Instead of using coiled springs in the barrels B the latter may merely act as elements of the universal joints, and spiral or other springs may be attached directly on the links D and to the plate E in such manner as to tend to move the legs A downward and forward.

The legs A, being in any case independently brought into operative position by their springs and being independently arrested and locked only when they come upon the ground, are equally well adapted to support the bicycle in the upright position when it is standing on a level roadway or when, owing to the camber of the roadway, the machine is standing upon a laterally-inclined surface, near the gutter, for instance, in which case the legs would be unequally divergent, as indicated by the dotted positions A* in Fig. 2.

The two cords H from the two barrels B after passing under the guide-pulleys $h^2$ are united and pass as a single cord H' around pulleys $h^3$ $h^4$ $h^5$ to a barrel I, to which the cord is attached and on which it is wound. This barrel I is loose on an outer sleeve J, on which the handle K is fixed, the sleeve J being fitted to turn on an inner tube L, cemented or otherwise fixed upon the handle-bar R. The barrel I is engaged, by a key or lug $m$ or other clutch-like connection, with a ratchet-toothed disk M, fixed upon the sleeve J and engaged by a spring-pawl $m'$, and the barrel is free to slide upon the sleeve J to the extent necessary to effect the disengagement of the clutch connection with the ratchet-wheel M. This disengagement is effected by means of a disk N, interposed between I and M and free to slide upon the sleeve J and the key or lug $m$, this disk being of rather larger diameter than the barrel, so as to admit of being readily grasped for the purpose of drawing the barrel out of engagement without removing the hand from the handle K. The barrel I is then free to revolve and permit the cord to unwind under the pull of the springs, and thereby allow the legs A to come instantaneously into action. The pulley $h^5$, over which the cord is led onto the barrel I, is so placed with regard to the barrel I that the pull of the cord will tend to maintain the engagement of the barrel with the ratchet-wheel. I do not, however, limit myself to the mechanism described for winding up the cord by means of the handle, as any other suitable means of operating the cord or other connection for bringing the supporter-legs into operative position might be adopted.

To enable (in winding up the cord on the barrel I) the resistance due to the pressure of the supporting-legs upon the ground and the stress of the springs to be easily overcome, multiple-purchase gear of any suitable kind may be interposed in the length of the cord H' to enable the required power to be obtained at the expense of a greater number of turns of the handle K. Such multiple purchase might be obtained by a pair of pulley-blocks, the part of the cord H' which winds on the barrel running around the sheaves of the blocks and being made fast to one of them, while the part of the cord which connects with the cords H would be attached to the nearest pulley-block.

I claim—

1. A bicycle-supporter comprising a pair of legs pivoted to work upon universal joints at opposite sides of the rear part of the main frame, in combination with springs so applied as to tend to swing the legs downward about their universal axes and with controlling-links universally joined to the main frame and to the legs whereby the legs are constrained to diverge outward when lowered, and brought close alongside the rear wheel when raised, substantially as specified.

2. A bicycle-support comprising a pair of legs universally pivoted at opposite sides of the rear part of the main frame, independently-acting spring-barrels forming one member of the universal joints and tending to throw the legs into operative position, controlling-links whereby the legs are constrained to assume a divergent position when lowered, and ratchet-and-pawl detent-gear in connection with the spring-barrels consisting of a fixed ratchet-quadrant concentric with the barrel-axis, and a pawl pivoted to the barrel so as to be adapted, when the legs are so lowered, to lock the legs in the lowered and divergent position, substantially as specified.

3. The combination with a bicycle-supporter comprising a pair of universally-pivoted legs to work upon extensions of the rear-wheel spindle, links whereby the legs are constrained to diverge when lowered, and are brought close alongside the rear wheel when raised, spring-barrels tending to throw the legs into operative position, and ratchet-and-pawl detent-gear applied to the spring-barrels for retaining the legs in that position, of pull connections attached to the retaining-pawls and adapted to disconnect the pawls from the ratchets and to raise the legs when pulled upon, substantially as described.

4. The combination with the universally-pivoted legs, their operative spring-barrels, retaining pawl-and-ratchet gear and cords for releasing and turning the barrels as described, of a revoluble handle on the handle-bar, means for preventing its backward rotation, a winding-barrel adapted to turn and slide on said handle, a spring-pressed clutch adapted to couple the winding-barrel to the said handle and to permit its disconnection therefrom, and means for disconnecting the barrel from the handle and for permitting the independent revolution of the barrel for unwinding the cord.

5. The combination with a bicycle-handle mounted to rotate upon the handle-bar and provided with retaining-gear, of a winding-barrel coupled therewith by a clutch connection so as to be adapted to be disconnected therefrom and to revolve independently thereof, substantially as and for the purpose specified.

6. In a bicycle-support, the combination of a stationary member, a barrel mounted to roll thereon, a supporting-leg pivotally connected with the barrel, and a link universally connected with the leg and with the said stationary member.

7. In a bicycle-support, the combination with a stationary member, of a barrel mounted to turn thereon, a leg pivotally connected with the barrel, a link universally joined to the leg and to the said stationary member, a spring serving to throw the barrel in one direction, and a clutch mounted to turn with the barrel and to engage a part fixed to said stationary member, by which clutch to hold the barrel in a position contrary to the tendency of the spring.

HENRY VANDER WEYDE.

In presence of—
E. S. BROWNE,
T. W. KENNARD.